Figure 1:
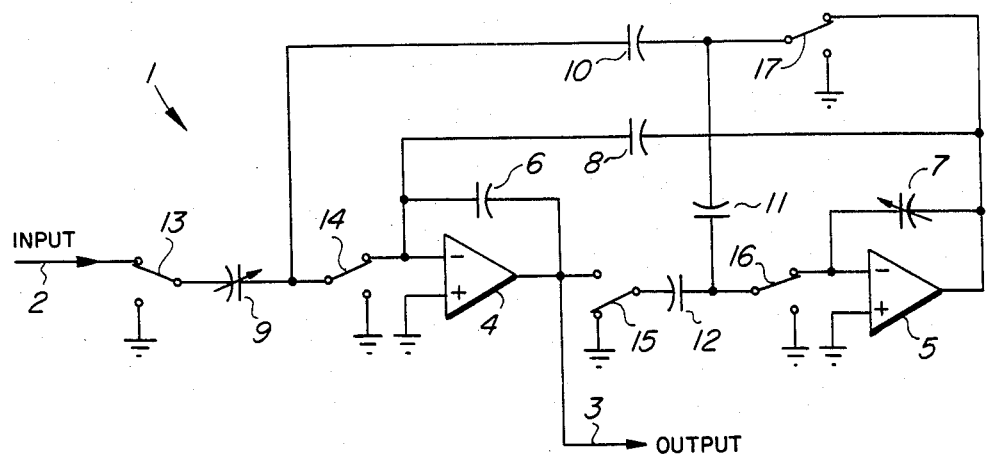

United States Patent [19]

Bennett

[11] Patent Number: 4,494,082

[45] Date of Patent: Jan. 15, 1985

[54] SWITCHED-CAPACITOR VARIABLE EQUALIZER

[75] Inventor: Jeffrey H. Bennett, Ottawa, Canada

[73] Assignee: Northern Telecom Limited, Montreal, Canada

[21] Appl. No.: 411,416

[22] Filed: Aug. 25, 1982

[51] Int. Cl.³ .............................................. H04B 3/14
[52] U.S. Cl. .................................. 333/28 R; 333/173; 330/304; 330/109
[58] Field of Search ............ 333/28 R, 173; 330/107, 330/51, 109, 304; 381/103

[56] References Cited

U.S. PATENT DOCUMENTS 4,315,227  2/1982  Fleischer et al. ................... 333/173

OTHER PUBLICATIONS

Gazin J. F. "The MOS Transistor—an Analogue Switching Device Part 2; Application". *Electronic Components*, vol. 16, No. 15, Sep. 10, 1974, pp. 31-34.

*Primary Examiner*—Eugene R. LaRoche
*Assistant Examiner*—Benny T. Lee
*Attorney, Agent, or Firm*—R. John Haley

[57] ABSTRACT

An equalizer for non-loaded telephone lines comprises an active switched-capacitor biquadratic filter including two differential amplifiers. An unswitched capacitor connected between the output and inverting input of one amplifier is variable to vary the equalizer response, the output being derived from the output of the other amplifier. One or more through-switched input capacitors can be simultaneously variable to provide a fixed equalizer gain at a predetermined frequency. The variable capacitors are constituted by fixed capacitors selectively switched in parallel with one another.

10 Claims, 4 Drawing Figures

SWITCHED-CAPACITOR VARIABLE EQUALIZER

This invention relates to a switched-capacitor variable equalizer, especially for equalizing signals conducted via non-loaded telephone lines.

It is well-known to provide an equalizer to compensate for the variation with frequency of the attenuation of a telephone line. For a non-loaded telephone line, an equalizer for voice-frequency signals is desired to have a gain which rises at an increasing rate with frequency within the voice-band, and falls at frequencies above the voice-band. If the equalizer is to be used for signals conducted via different lines which have different attenuations, then the equalizer characteristics must be variable to compensate properly for the different attenuations.

Known equalizers tend to be large and not susceptible to integration, as is desirable for example where the equalizer is to form part of a voice-frequency signal repeater. Accordingly an object of this invention is to provide a novel variable equalizer, which is particularly suitable for integration.

According to this invention there is provided a variable equalizer comprising an active switched-capacitor biquadratic filter including two amplifiers each having an unswitched capacitor coupled between an output and an inverting input of the amplifier, means for varying the capacitance of the unswitched capacitor coupled between the output and the inverting input of one of the amplifiers thereby to vary the equalizer characteristics, and means for deriving an output of the equalizer from the output of the other of the amplifiers.

The filter further includes a diagonally-switched capacitor coupled between the output of a first one of the amplifiers and the inverting input of a second one of the amplifiers, a through-switched capacitor coupled between the output of the second amplifier and the inverting input of the first amplifier, and switched-capacitor means coupled between an input of the equalizer and the inverting input of at least one of the amplifiers.

In an embodiment of the invention the output of the equalizer is derived from the output of the first amplifier, the capacitance of the unswitched capacitor coupled between the output and the inverting input of the second amplifier is variable, and the switched-capacitor means comprises a through-switched capacitor coupled between the input of the equalizer and the inverting input of the first amplifier, the equalizer further comprising an unswitched capacitor coupled between the output of the second amplifier and the inverting input of the first amplifier, and a through-switched capacitor coupled between the output and the inverting input of the second amplifier.

This embodiment conveniently includes means for varying the capacitance of the through-switched capacitor coupled between the input of the equalizer and the inverting input of the first amplifier. Preferably the means for varying the capacitances of the unswitched and through-switched capacitors comprises means for simultaneously varying said capacitances to vary the equalizer characteristics whilst maintaining a constant equalizer gain at a predetermined frequency.

In another embodiment of the invention the output of the equalizer is derived from the output of the second amplifier, the capacitance of the unswitched capacitor coupled between the output and the inverting input of the first amplifier is variable, and the switched-capacitor means comprises two through-switched capacitors each coupled between the input of the equalizer and the inverting input of a respective one of the first and second amplifier. The capacitances of the two through-switched capacitors constituting the switched-capacitor means may be variable.

Conveniently each capacitor whose capacitance is variable is constituted by a plurality of fixed capacitors, and the means for varying the capacitance of the capacitor comprises switching means for selectively connecting said fixed capacitors in parallel with one another to produce the variable capacitance.

Thus this invention faciliates the provision of a variable equalizer, especially for equalizing signals conducted via non-loaded telephone lines, which can conveniently be incorporated, for example together with other components of a voice-frequency signal repeater, in an integrated circuit.

Figure 4:
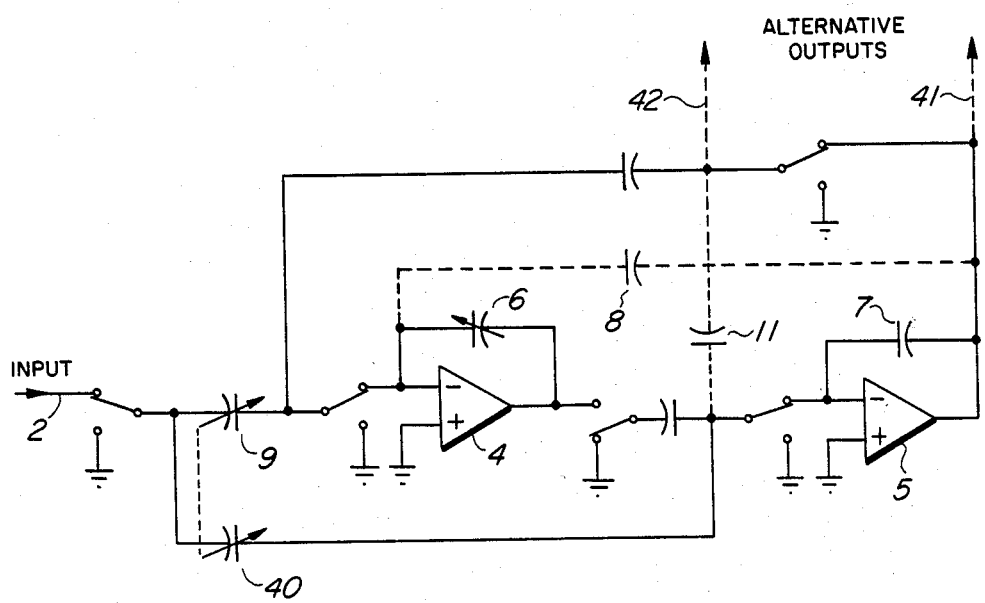
Figure 2:
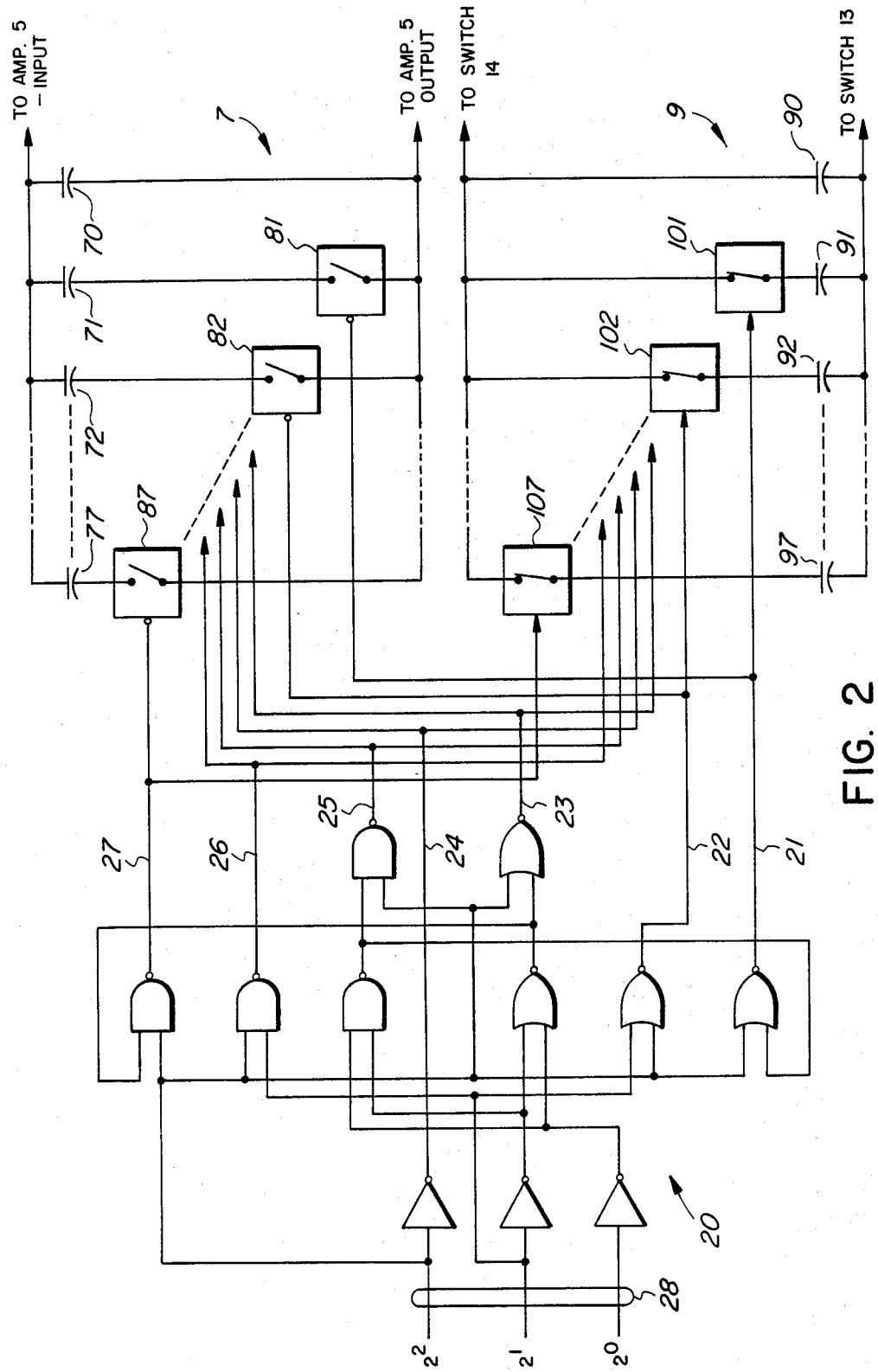
Figure 3:
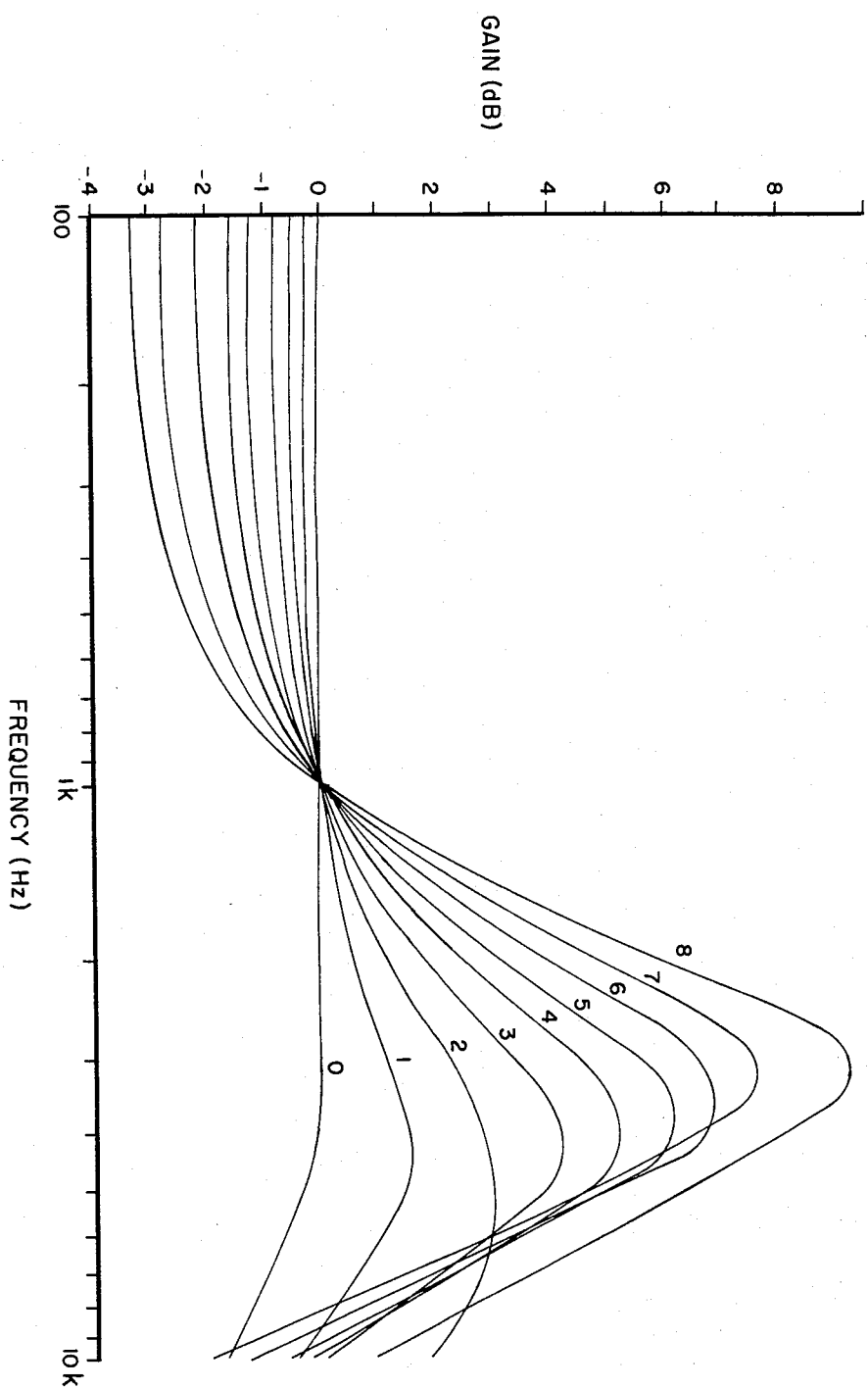

The invention will be further understood from the following description with reference to the accompanying drawings, in which:

FIG. 1 schematically illustrates a variable equalizer in accordance with an embodiment of the invention;

FIG. 2 schematically illustrates the form of variable capacitors which are provided in the equalizer;

FIG. 3 is a graph illustrating gain-frequency characteristics of the equalizer; and FIG. 4, which is on the same sheet as FIG. 1, schematically illustrates a variable equalizer in accordance with another embodiment of the invention.

The invention uses switched-capacitor techniques. As used herein, the term "unswitched capacitor" means a capacitor that is permanently connected in the circuit, the term "through-switched" capacitor" means a switched-capacitor whose two terminals are simultaneously grounded during one of two switching states, and the term "diagonally-switched capacitor" means a switched-capacitor whose terminals are alternately grounded during successive ones of two switching states. In FIGS. 1 and 4 the various switches of the switched-capacitors are shown in one of their two switching states; all of these switches are operated in synchronism by means not shown. The switches in FIG. 2 are separately controlled as described below. All of the switches can be controlled and implemented by CMOS devices as is well-known in the art.

The equalizer illustrated in FIG. 1 comprises an active switched-capacitor biquadratic filter 1 having an input line 2 and an output line 3. The form of the filter can be derived from the generalized switched-capacitor active filter described in Fleischer et al. U.S. Pat. No. 4,315,227 issued Feb. 9, 1982.

The filter 1 includes two differential amplifiers 4 and 5, whose non-inverting inputs are grounded, the output of the filter on the line 3 being derived from the output of the amplifier 4. The filter 1 also comprises unswitched capacitors 6 to 8, through-switched capacitors 9 to 11, a diagonally-switched capacitor 12, and switches 13 to 17. The capacitors 6 to 12 are respectively coupled between the output and the inverting input of the amplifier 4, the output and the inverting input of the amplifier 5, the output of the amplifier 5 and the inverting input of the amplifier 4, the input line 2 and the inverting input of the amplifier 4, the output of the amplifier 5 and the inverting input of the amplifier 4, the output and the inverting input of the amplifier 5, and the output of the amplifier 4 and the inverting input of the amplifier 5. The switch 13 serves for switching the capacitor 9, the switch 14 serves commonly for switching the capacitors 9 and 10, the switch 15 serves for switching the capacitor 12, the switch 16 serves commonly for switching the capacitors 11 and 12, and the switch 17 serves commonly for switching the capacitors 10 and 11.

As illustrated in FIG. 1, the capacitors 7 and 9 are variable to permit variation of the equalizer characteristics. FIG. 2 schematically illustrates a preferred form of these variable capacitors and of control circuitry for them.

As illustrated in FIG. 2, each of the capacitors 7 and 9 is constituted by a plurality of fixed capacitors and switches for selectively connecting the fixed capacitors in parallel with one another. Thus the capacitor 7 is constituted by a fixed capacitor 70, which is always connected in the circuit, and fixed capacitors 71 to 77 which are selectively connected in parallel with the capacitor 70 via switches 81 to 87 respectively. Similarly, the capacitor 9 is constituted by a fixed capacitor 90, which is always connected in the circuit, and fixed capacitors 91 and 97 which are selectively connected in parallel with the capacitor 90 via switches 101 and 107 respectively. For simplicity not all the capacitors and switches are shown in FIG. 2.

The switches 81 to 87 and 101 to 107 are commonly controlled, via a decoding logic circuit 20 and respective common control lines 21 to 27, by a 3-bit digital signal on 3 control lines 28, the weighting of which is illustrated in FIG. 2. The digital signal, which can for example be set up on the lines 28 by means of manually operated switches set according to the desired equalizer characteristic, can have values equivalent to the decimal values 0 to 7. The switches 81 to 87 and 101 to 107 are illustrated for the decimal input 0, for which all of the switches 81 to 87, which have inverting control inputs, are open so that the capacitor 7 has its minimum value equal to the capacitance of the capacitor 70, and all of the switches 101 to 107 are closed so that the capacitor 9 has its maximum value equal to the sum of the capacitances of the capacitors 90 to 97. For this input the equalizer has a substantially flat response as shown by the curve 0 in FIG. 3. Conversely, for the decimal input 7 the switches 81 to 87 are closed, the capacitor 7 has its maximum value equal to the sum of the capacitances of the capacitors 70 to 77, the switches 101 to 107 are open, the capacitor 9 has its minimum value equal to the capacitance of the capacitor 90, and the equalizer has the response shown by the curve 7 in FIG. 3. For other decimal inputs H (0<H<7), logic "0" levels are produced on the lines 21 to (20+H) so that the switches 81 to (80+H) and (101+H) to 107 are closed, the remaining switches being open, and the equalizer has the response shown by the relevant curve H in FIG. 3.

As can be seen from FIG. 3, the variable capacitance of the capacitor 7 enables the equalizer to have various different frequency response curves, which can conveniently be equally spaced by a predetermined amount at a selected frequency. The simultaneously variable capacitance of the capacitor 9 enables all of these curves to have the same gain at a predetermined frequency, such as 0 dB at 1 kHz as shown in FIG. 3. The variable capacitor 9 can be replaced by a fixed capacitor, if desired, in which case the various frequency response curves provided by varying the capacitance of the capacitor would all have the same gain at a frequency of zero, or d.c.

As will be appreciated by those skilled in the art, the equalizer described above can be implemented, together with other switched-capacitor circuitry if desired, in a single integrated circuit, for example using a CMOS double polysilicon process. In such an arrangement, in which the bottom plate of each capacitor is represented by a curved line in the drawings, used as an equalizer for voice-frequency signals carried via non-loaded telephone lines, the capacitors can have the following magnitudes to provide equalizer response curves which are 1 dB apart at a frequency of 2.8 kHz:

| Capacitor | Magnitude (pF) | Capacitor | Magnitude (pF) |
|---|---|---|---|
| 6 | 2.51 | 76 | 1.29 |
| 8 | 4.14 | 77 | 1.55 |
| 10 | 1.211 | 90 | 0.882 |
| 11 | 0.606 | 91 | 0.031 |
| 12 | 0.606 | 92 | 0.038 |
| 70 | 2.23 | 93 | 0.04 |
| 71 | 0.93 | 94 | 0.044 |
| 72 | 0.91 | 95 | 0.052 |
| 73 | 0.945 | 96 | 0.059 |
| 74 | 1.015 | 97 | 0.069 |
| 75 | 1.13 | | |

The invention is not limited to the embodiment described above, to which numerous modifications may be made. For example, the variable capacitors 7 and 9 could be constituted by binary-weighted fixed capacitors selected by switches controlled directly by the signals on the control lines 28, obviating the need for the decoding logic 20, if such binary weighting produced acceptable equalizer responses. Furthermore, any desired number and separation of equalizer responses can be provided.

Other possible modifications are illustrated in FIG. 4, which is generally similar to FIG. 1 and is described below only in respect of those features where it differs from FIG. 1.

In FIG. 4, the input line 2 is coupled not only to the inverting input of the amplifier 4 via the through-switched capacitor 9, but also to the inverting input of the amplifier 5 via a through-switched capacitor 40. For gain equalization at a desired non-zero frequency, in this case the capacitance of the capacitor 40 is made variable with that of the capacitor 9, in the same manner as described above. In this arrangement the capacitor 6 is variable and the capacitor 7 is fixed, instead of the other way round as in FIG. 1, and the output of the equalizer is derived from the output of the amplifier 5 instead of the amplifier 4. This output can be obtained directly via a line 41 shown dashed in FIG. 4, or via the switch 17 and another line 42 shown dashed in FIG. 4, the switch 17 in the latter case also serving a capacitor switching function for a following switched-capacitor stage. In FIG. 4 the capacitors 8 and 11 are also shown as being connected via dashed lines; only one of the capacitors 8 and 11 need be provided in this arrangement.

As in the case of the capacitor 9 in the equalizer of FIG. 1, the capacitors 9 and 40 in the equalizer of FIG. 4 can be replaced by fixed capacitors, in which case the equalizer of FIG. 4 uses the same numbers of capacitors and switches as that of FIG. 1.

Thus numerous modifications, variations, and adaptations may be made to the described embodiments without departing from the scope of the invention as defined in the claims.

What is claimed is:

1. A variable equalizer comprising an active switched-capacitor biquadratic filter including two amplifiers each having an unswitched capacitor coupled between an output and an inverting input of the amplifier, a diagonally-switched capacitor coupled between the output of a first one of the amplifiers and the inverting input of a second one of the amplifiers, a through-switched capacitor coupled between the output of the second amplifier and the inverting input of the first amplifier, switched-capacitor means coupled between an input of the equalizer and the inverting input of at least one of the amplifiers, means for varying the capacitance of the unswitched capacitor coupled between the output and the inverting input of one of the amplifiers thereby to vary the equalizer characteristics, and means for deriving an output of the equalizer from the output of the other of the amplifiers.

2. An equalizer as claimed in claim 1 wherein the output of the equalizer is derived from the output of the first amplifier, the capacitance of the unswitched capacitor coupled between the output and the inverting input of the second amplifier is variable, and the switched-capacitor means comprises a through-switched capacitor coupled between the input of the equalizer and the inverting input of the first amplifier, the equalizer further comprising an unswitched capacitor coupled between the output of the second amplifier and the inverting input of the first amplifier, and a through-switched capacitor coupled between the output and the inverting input of the second amplifier.

3. An equalizer as claimed in claim 2 and including means for varying the capacitance of the through-switched capacitor coupled between the input of the equalizer and the inverting input of the first amplifier.

4. An equalizer as claimed in claim 3 wherein the means for varying the capacitances of the unswitched and through-switched capacitors comprises means for simultaneously varying said capacitances to vary the equalizer characteristics whilst maintaining a constant equalizer gain at a predetermined frequency.

5. An equalizer as claimed in claim 3 or 4 wherein each capacitor whose capacitance is variable is constituted by a plurality of fixed capacitors, and the means for varying the capacitance of the capacitor comprises switching means for selectively connecting said fixed capacitors in parallel with one another to produce the variable capacitance.

6. An equalizer as claimed in claim 1 wherein the output of the equalizer is derived from the output of the second amplifier, the capacitance of the unswitched capacitor coupled between the output and the inverting input of the first amplifier is variable, and the switched-capacitor means comprises two through-switched capacitors each coupled between the input of the equalizer and the inverting input of a respective one of the first and second amplifiers.

7. An equalizer as claimed in claim 6 and including an unswitched capacitor coupled between the output of the second amplifier and the inverting input of the first amplifier.

8. An equalizer as claimed in claim 6 and including a through-switched capacitor coupled between the output and the inverting input of the second amplifier.

9. An equalizer as claimed in claim 6, 7, or 8 and including means for varying the capacitances of the two through-switched capacitors constituting the switched-capacitor means.

10. An equalizer as claimed in claim 2 or 6 wherein the unswitched capacitor whose capacitance is variable is constituted by a plurality of fixed capacitors, and the means of varying the capacitance of the capacitor comprises switching means for selectively connecting said fixed capacitors in parallel with one another to produce the variable capacitance.

* * * * *